(12) United States Patent
Khem et al.

(10) Patent No.: US 9,456,148 B1
(45) Date of Patent: Sep. 27, 2016

(54) MULTI-SETTING PREVIEW FOR IMAGE CAPTURE

(71) Applicant: Amazon Technologies, Inc., Reno, NV (US)

(72) Inventors: Dynin Hong Khem, Seattle, WA (US); Scott Oja Ward, Seattle, WA (US); Nicholas Ryan Gilmour, San Jose, CA (US); Vivek Shah, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/030,960

(22) Filed: Sep. 18, 2013

(51) Int. Cl.
*H04N 5/262* (2006.01)

(52) U.S. Cl.
CPC ..................................... *H04N 5/262* (2013.01)

(58) Field of Classification Search
USPC ............................................. 348/333.11, 47
See application file for complete search history.

(56) References Cited

U.S. PATENT DOCUMENTS

| | | | |
|---|---|---|---|
| 2006/0044444 A1* | 3/2006 | Okamoto et al. | 348/333.05 |
| 2010/0053324 A1* | 3/2010 | Kim et al. | 348/142 |
| 2011/0090313 A1* | 4/2011 | Tsuchita | 348/46 |
| 2011/0187914 A1* | 8/2011 | Lee | 348/333.11 |
| 2011/0204209 A1* | 8/2011 | Barrows | 250/208.1 |
| 2012/0120186 A1* | 5/2012 | Diaz et al. | 348/36 |

* cited by examiner

*Primary Examiner* — Mark Monk
(74) *Attorney, Agent, or Firm* — Polsinelli LLP

(57) ABSTRACT

The ability of a user to acquire satisfactory images in varying imaging conditions can be improved by enabling the user to select one or more scene settings that are appropriate for current conditions. In some embodiments, a camera instructed to capture an image can instead capture multiple images, each with different camera settings corresponding to a respective scene setting. The user can then view at least some of these images, and select one or more images that appeal to the user. In some embodiments, this selection process can be used to determine the appropriate settings for the current conditions, and then enable the user to capture images using those settings. The user can also customize, change the selection of, or obtain additional scene settings.

20 Claims, 8 Drawing Sheets

MULTI-SETTING PREVIEW FOR IMAGE CAPTURE

BACKGROUND

Users are increasingly utilizing electronic devices such as tablets and smart phones, in addition to conventional digital cameras, to capture images. Many of these users are not experienced photographers, and thus may not be familiar with how to adjust various settings in order to produce an image with acceptable quality for given lighting conditions, distances, and other such factors. Often, a user will compose an image and then cause the image to be captured, but will not like the result due to issues such as color, brightness, or contrast. The user must then change one or more camera settings, recompose the image, and capture another image. The process typically continues until the user is satisfied with a captured image or gives up due to frustration. While some devices attempt to help the user by providing settings for specific modes, such as self-portrait or night photo capture mode, these settings often are not sufficient to provide for adequate image capture in all situations, and often a user will not know which of the modes to use to capture the best image even if one of the modes would be sufficient.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to capturing images using an electronic device. In particular, various embodiments enable a user to preview image quality at various camera settings in order to obtain an image that is satisfactory to the user. In some embodiments, a user will press a shutter release element (i.e., a physical button or virtual element on a touch screen) or otherwise provide an input to a device to capture an image. In response, one or more cameras on the device will capture a series of images with different camera settings, where those settings can include settings such as an exposure time or exposure setting, gain settings, shutter speed settings, flash settings, and the like. The device can display at least a subset of those images, and the user can select one or more of the images to save, based at least in part upon a subjective preference of the user in many cases. In other embodiments, the device might capture images with different settings and display at least a subset of those images to the user, who then can select at least one of those images as having an image quality that is desirable to the user. The settings used to capture that image then can be applied to the camera for subsequent image capture.

Various other functions and advantages are described and suggested below as may be provided in accordance with the various embodiments.

Figure 1A:
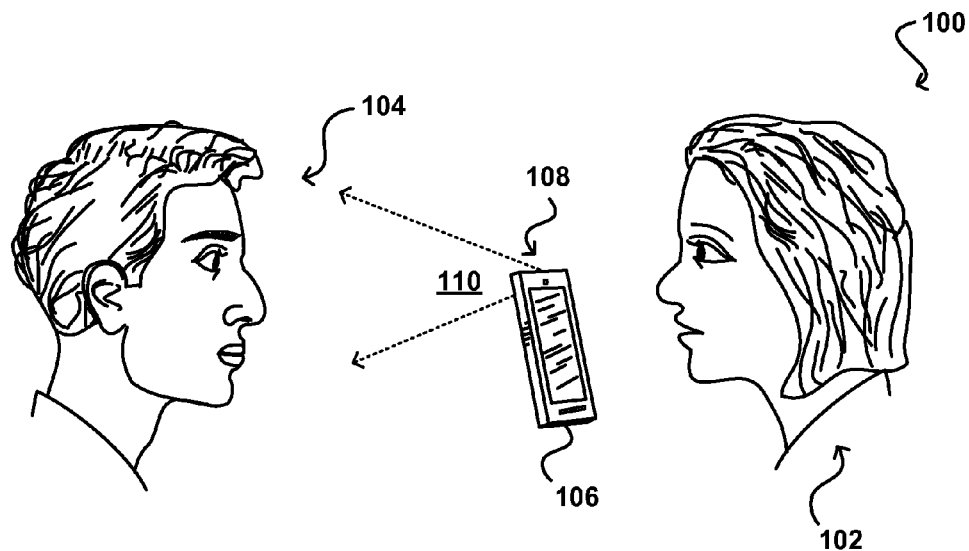
FIGS. 1(a), 1(b), and 1(c) illustrate an example situation wherein a user is attempting to capture an image of another person using different camera settings.

FIG. 1(a) illustrates an example environment 100 in which aspects of various embodiments can be implemented. In this example, a user 102 is attempting to capture an image of another person 104 using a camera 108 of a computing device 106. Although a portable computing device (e.g., a smart phone or tablet computer) is shown, it should be understood that any electronic device capable of receiving, determining, and/or processing input can be used in accordance with various embodiments discussed herein, where the devices can include, for example, desktop computers, electronic book readers, notebook computers, personal data assistants, video gaming consoles, television set top boxes, smart televisions, wearable computers (e.g., watches or glasses), digital cameras, and portable media players, among others. The camera can be part of, or include, a camera component or camera assembly that includes various elements useful for acquiring images, such as at least one camera sensor, at least one lens, a shutter, and the like. A camera component can also include various other elements as well, such as memory, microprocessors, microcontrollers, and the like. The camera sensor may also be a single sensor, a multi-part sensor, or a sensor array, among other such options. There can also be one or multiple cameras, of the same or different types, positioned at various places on, in, or connected to a computing device.

In this example, the user 102 will typically compose the image to be captured. As used herein, "compose" refers to a user performing tasks such as adjusting an angle, distance, position or other aspects of a camera and/or one or more objects to be imaged, such that an image subsequently captured will represent an object or view that appeals to the user. In this example, the user will likely hold the device 106 at a location and with an orientation such that the face of the other person 104 is relatively centered in a field of view 110 of the camera 108 that will be used to capture an image of that person. The user can perform other tasks as well, such as to ask the person to move or pose, adjust a zoom level of the camera, flip the device so the camera captures in landscape versus portrait orientation, etc. Once the user has composed the view to the satisfaction of the user, the user can select a capture button (physical or virtual) or provide another such input to cause an image to be captured.

Figures 1B, 1C:
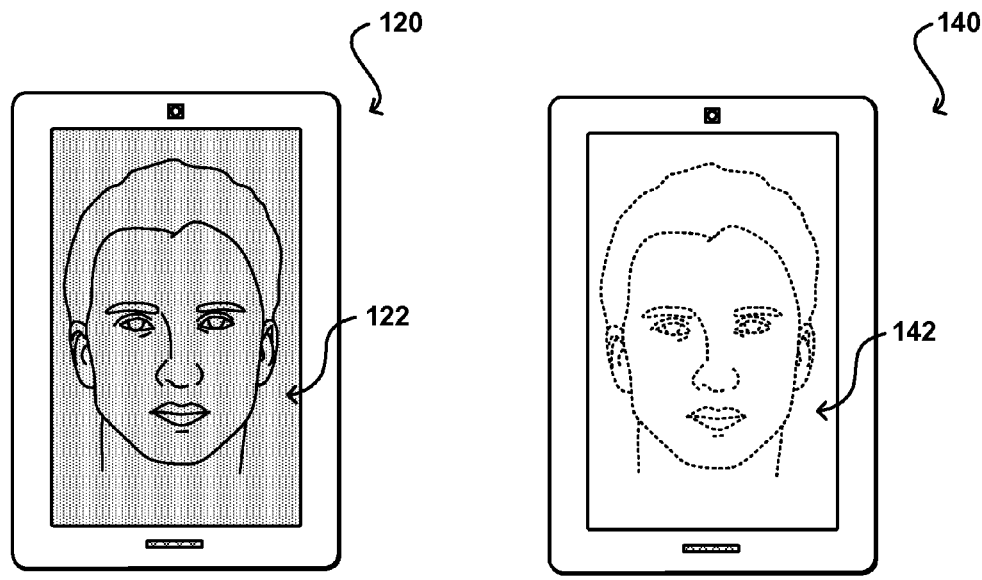

In many cases, users (particularly of portable computing devices) do not spend much time adjusting settings before capturing an image, and want instead to be able to use a one-click capture. Unfortunately, factors such as lighting conditions and distance can impact the quality of the image obtained. For example, FIG. 1(b) illustrates an example situation 120 wherein an image 122 captured by a user did not have adequate lighting or exposure, for example, which resulted in an image that is relatively dark and, as such, may not be satisfactory to the user. Similarly, FIG. 1(c) illustrates an example situation 140 wherein an image 142 captured by a user is washed out and has very little contrast, which also may not be satisfactory to the user. In either case, the user might attempt to adjust one or more settings and capture another image, which involves recomposing the image to be captured, checking the quality, and then repeating until the user is satisfied or does not want to try any longer. Even if the user is willing to attempt to adjust the settings and capture one or more additional images to attempt to obtain an image that satisfies the user, the user may not know which settings to adjust and/or the appropriate direction to adjust any of those settings (e.g., to increase or decrease shutter speed, etc.).

Accordingly, approaches in accordance with various embodiments can assist a user in obtaining an image that will be satisfactory to that user, at least from an aesthetic or other such point of view. In various embodiments, various "scene settings" can be utilized to assist a user in capturing a satisfactory image. These scene settings can each include values for a plurality of camera settings, where each set of values can be selected based on one or more types of common imaging conditions that might be encountered. Imaging conditions can relate to conditions such as the amount of ambient light, amount of infrared light, distance to one or more objects, amount of movement or motion, and the like. For example, in order to account for different imaging conditions one scene setting might be for a daytime self-portrait with a typical amount of lighting, one scene setting might be for an outdoor photo in direct sunlight, one setting might be for objects in the distance in a low lighting situation, etc. In at least some embodiments, a device and/or camera application can come with a default set of scene settings, although additional scene settings can be obtained or created in various embodiments. Further, as discussed elsewhere herein, a user can have the ability to customize or adjust various scene settings as well.

In one example approach, a group of scene settings can be pre-selected to be used when capturing an image. In some embodiments these scene settings can be used automatically, while in other embodiments a user must enter an imaging mode such as a "scene mode" or select a similar option for the scene settings to be utilized. In one embodiment, a user causes a camera application and/or device to operate in a scene mode, and then upon composing an image to be captured selects a "capture" or similar option. The camera hardware and/or software then can select one of the scene settings and apply that scene setting to the camera (and/or device, where appropriate) and cause an image to be captured using that scene setting. The first scene setting to be used can be selected by default, specified by a user, based on feedback or usage history of a user, determined by lighting conditions as determined by a light sensor or other such element. The scene setting can be selected using other data as well, such as geo-location data from a global positioning system (GPS) device, direction data from an electronic compass, weather data from an electronic barometer, time and date data from a digital clock, etc. The scene setting can also be selected based at least in part upon selections the user has previously made under similar imaging conditions. The camera settings can be adjusted again for each of the scene settings to be used, and another image captured. The number of scene settings to use, and number of images to capture, also can be set by default, specified by the user, based upon current conditions, or otherwise configured. For example, there might be a different number of settings for bright imaging conditions than for dark imaging conditions, such that a different set and/or number of scene settings can be used for each of these conditions.

Figure 2A:
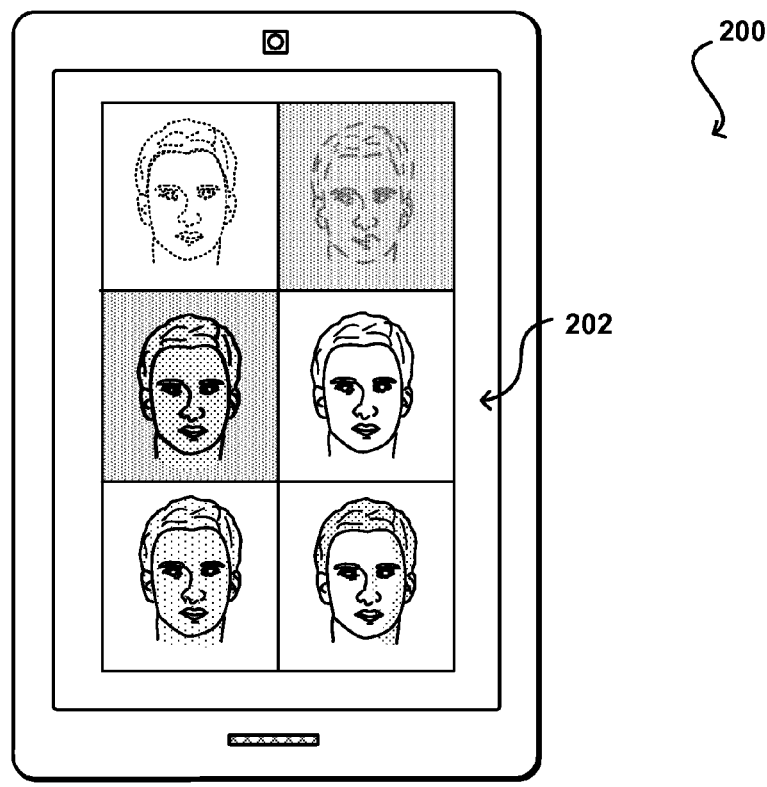
FIGS. 2(a), 2(b), and 2(c) illustrate an example approach to enabling a user to select from a set of images captured with different camera settings in accordance with various embodiments.
Figure 2B:
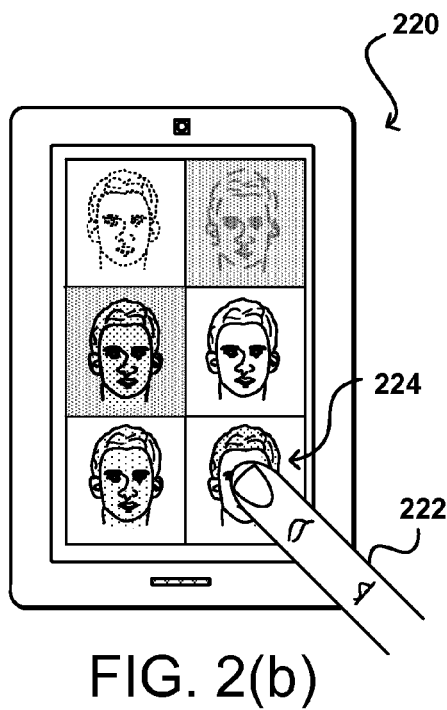
Figure 2C:
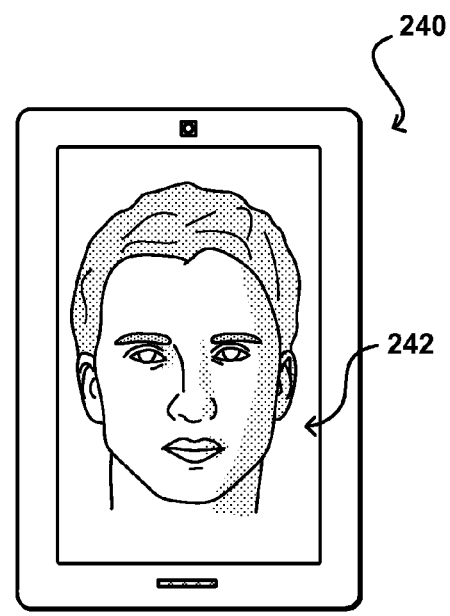

Once the set of images has been captured, or at least a subset of the images has been captured, some or all of the captured images can be displayed to the user. For example, FIG. 2(a) illustrates an example situation 200 wherein a set of images 202 captured with different scene settings is displayed to the user. As illustrated, each of the images can have differing image qualities, such as different brightness levels, levels of contrast, color balances, and the like. A user can view these images, and can determine which of the images most appeals to the user, or meets some other selection criterion in the mind of the user (or otherwise specified). For example, FIG. 2(b) illustrates a situation 220 where the user has determined that one 224 of the images is preferred by the user, such as where the camera settings resulted in an image with satisfactory brightness, color, and contrast. The user can select that image 224, such as by touching a corresponding region of a touch screen using a finger 222 or object, or otherwise making the selection. In some embodiments, a user might be able to select more than one of the images as desirable to the user. FIG. 2(c) illustrates the situation 240 wherein the user has selected the image 224, previously displayed in thumbnail form in this example, and then the full image 242 can be displayed to the user so the user can determine whether the user wants to keep the image or perform another such action. If the user selects to keep the image, at least for a period of time, the selection can result in the image being stored in non-volatile memory, such as to a disk drive, cloud drive, or flash memory, among other such options.

In another embodiment, the user can select the scene setting or imaging mode to be used before capturing an image, and can allow those scene settings to remain in effect until the user changes them in at least some embodiments. For example, a user could activate an active scene mode, or a scene selection option, which could cause a set of images to be captured with different scene settings. The thumbnails displayed can be periodically updated as well, with the same or different scene settings, to reflect how each setting works with changes in lighting conditions. These images can then be displayed to the user, as illustrated in FIG. 2(a). A user could select the image 224 that the user prefers, as illustrated in FIG. 2(b), and then the scene setting corresponding to the selected image can be applied to the camera. Such an approach enables the user to select a scene setting before capturing or acquiring an image. Further, such an approach can enable the user to capture multiple images with those settings, without having to make a selection for each of the images that the user intends to have captured, which can save time and effort on the part of the user and thus improve the user experience. If the conditions change and the user wants to adjust the settings, the user can enter the scene selection mode again and another set of images can be captured with different scene settings, and the user can select the image with the settings that are most appropriate for the current conditions. Various other selection approaches can be used as well within the scope of the various embodiments.

As mentioned, there can be various camera settings that can be specified in a scene setting, and these settings can vary in selection and value ranges for different devices. One such setting is the ISO (for International Organization for Standardization) setting, which determines the sensitivity of the camera sensor to the amount of light present. This higher the ISO setting, the more sensitive the sensor is to light which enables images to be captured in lower light situations. Common settings for ISO are 100, 200, 400, and 800, although some cameras go up to 3200 ISO or higher. Another camera setting that can be adjusted is the white balance setting. The white balance setting can affect the way that a camera detects color, as different light sources such as daylight, tungsten lighting, and fluorescent lighting can cause colors to appear differently to the camera sensor, and adjusting the white balance setting accordingly can help remove or reduce tinting caused by these light sources. Many modern cameras have selectable white balance modes, such as tungsten mode, fluorescent mode, cloudy mode, and flash mode.

Another adjustable camera setting is the shutter speed or exposure setting, which refers to the length of time that a camera's shutter is open while capturing an image, controlling the amount of light that reaches the camera sensor. Common values for shutter speed range from one second down to $1/1000$ of a second, among other such values. Another adjustable setting is the color balance setting, which in some instances can be a common setting with the white balance setting. The color balance setting affects the intensities of colors, particularly the primary colors captured. The color balance setting helps colors to be rendered properly under varying lighting conditions, as red can appear very different in bright light than in low light, for example. Some cameras use white balance to balance neutral colors and color balance to balance dominant colors in an image. The color balance setting can cause an appropriate scaling factor to be applied to a relevant color. For example, if red is observed in an image to correspond to a value X in the image, and is determined to correspond to a true value of Y, then at least some of the values at or around red can have a scaling factor of Y/X applied. Another adjustable camera setting is the aperture value, which controls the size of the aperture ring through which light passes to the camera sensor, in part determining the depth of field in a picture. More light translates generally into a shallower depth of field, and an aperture value of f/8 is wider and allows more light into the camera than an aperture value of f/16. Various other f-stop values can be applied for aperture settings as well within the scope of the various embodiments. Various other settings can be specified as well, such as flash on/off, LED brightness values, etc.

Figure 3A:
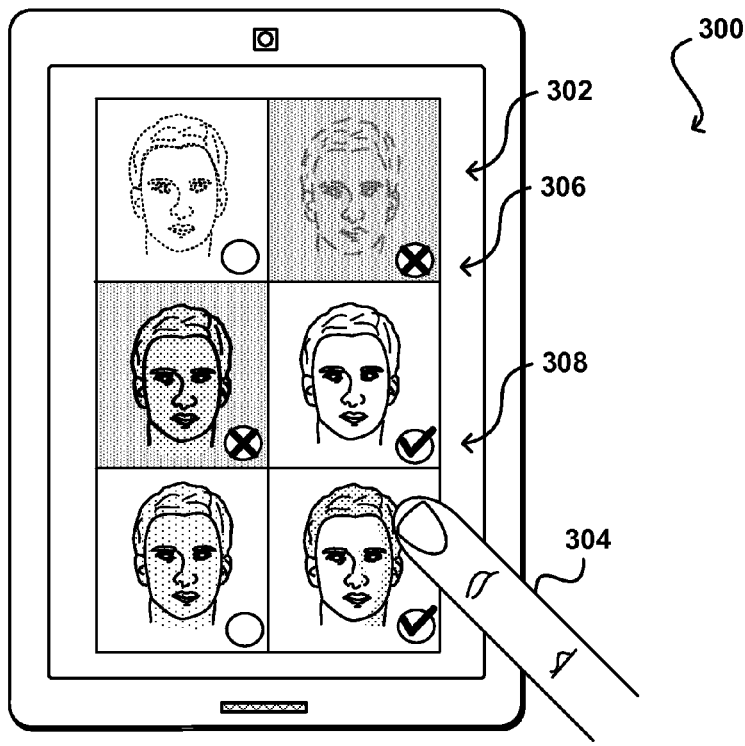
FIGS. 3(a) and 3(b) illustrate an example approach to enabling a user to refine camera settings used to capture an image that can be used in accordance with various embodiments.
Figure 3B:
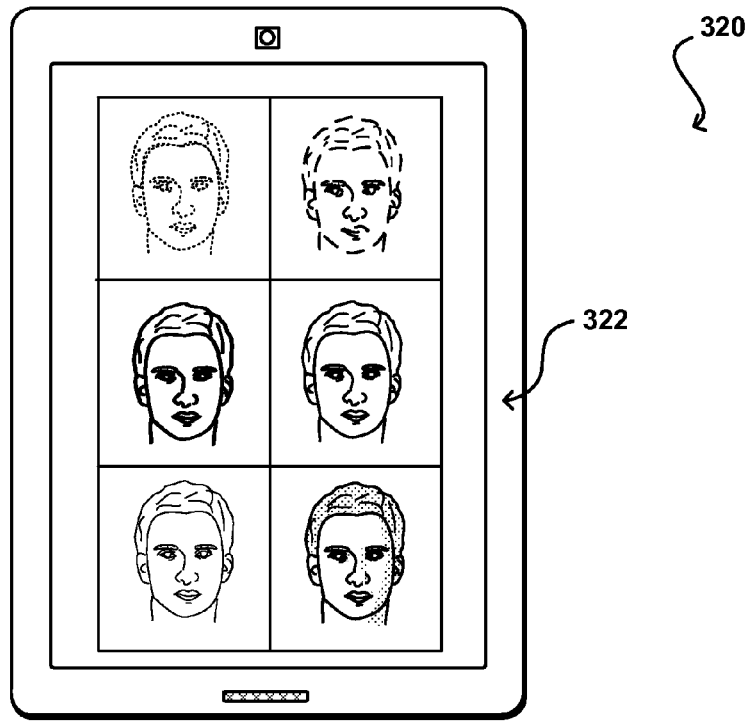

In some embodiments, a user can modify the scene settings that are used overall and/or for a particular image to be captured. For example, FIG. 3(a) illustrates an example situation 300 wherein a user is able to view multiple images 302 that were captured using different scene settings. In this example, the user is able to indicate images that the user likes and/or does not like. For example, the user can select an option 306 to indicate that the user does not like the camera settings that were used to capture that image, or an option 308 to indicate that the user does like the camera settings used to capture a certain image. The device and/or software can then use this information to update the selection of scene settings used to capture images for the user, such as is represented by the updated set of images 322 in the situation 320 illustrated in FIG. 3(b). In one example, any scene setting that the user indicates he or she does not like can be removed from the selection. Any scene setting that the user indicates he or she does like can be kept in the selection, and new scene settings added where previous settings have been removed. In other embodiments, these indications can be used to provide a selection of scene settings that will more likely appeal to the user, at least for current conditions. For example, any image that a user selects as being captured with favorable camera settings can be used to select similar scene settings. Scene settings indicated to not be favorable can cause similar scene settings to also not be selected. Scene settings that do not receive an indication either way may have little to no impact on the subsequent scene setting selection. Similar options, such as "more like this" or "not like this" also can be used in various embodiments. In some embodiments, such a selection process can enable a user to create new scene settings by indicating images that the user likes, which then can be used to create new scene settings based on combination and/or variations of settings that the user selects.

Figure 4A:
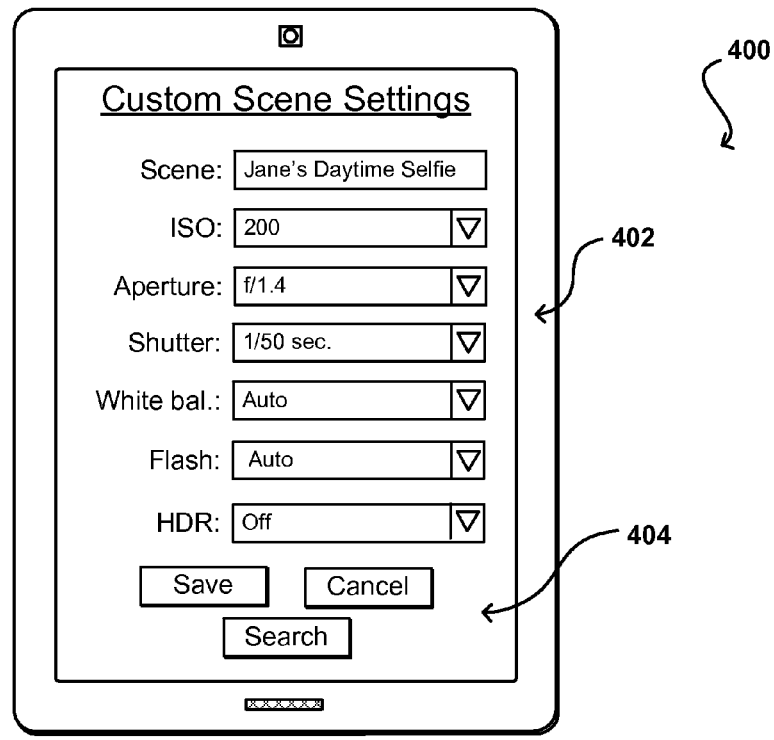
FIGS. 4(a) and 4(b) illustrate example interfaces for enabling a user to specify or create custom scene settings that can be presented on a computing device in accordance with various embodiments.
Figure 4B:
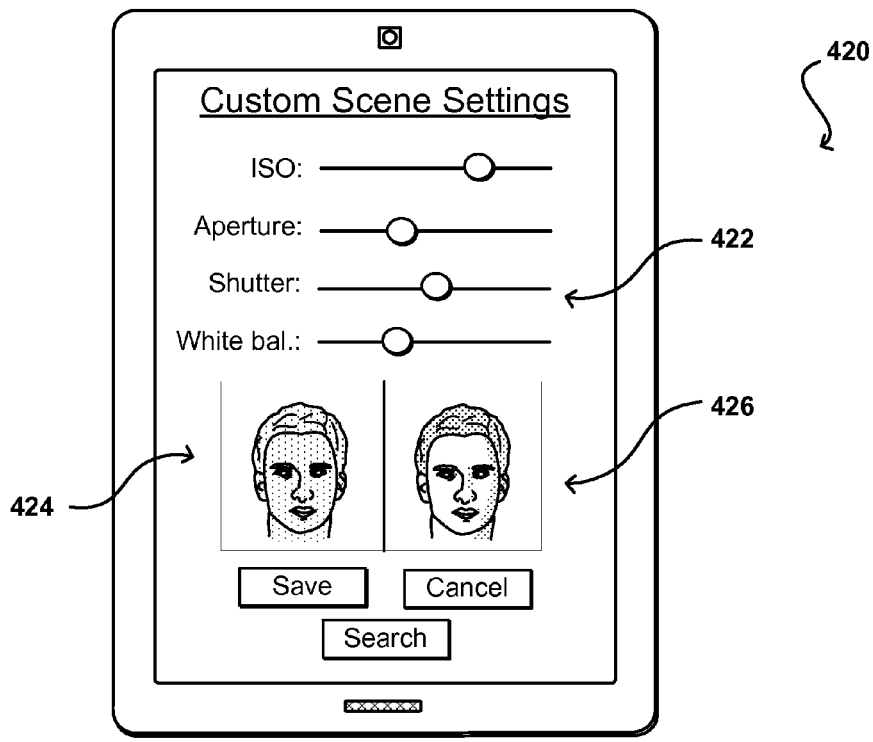

FIG. 4(a) illustrates an example of another approach 400 to generating new scene settings that can be utilized in accordance with various embodiments. In this example, a user is able to select from predetermined values for each of a plurality of camera settings 402. The user can specify a name for the setting in this example, and in some embodiments can manually input values for at least some settings. The user can then select one or more options 404 to save or cancel the creation of the new scene setting, or to search for other scene settings. In some embodiments, a user can search a network, such as the Internet, for scene settings to utilize, or can obtain settings from friends, social networks, other devices, or other such sources. In some embodiments, a user can download or purchase scenes created by photography or imaging professionals. In still other embodiments, users can have the options of obtaining scene settings from images that the user likes, where those images might be designated in some way as having such information available. In embodiments where images are tagged, with geo-coordinates or other information, a user also might be able to view scene settings that were used by others at that location, under similar lighting conditions, etc. FIG. 4(b) illustrates an example of another approach 420 to generating new scene settings. In this example, a set of slider bars 422 or other such elements or dials are presented to a user. The user also can be presented with an image 426 captured using the adjusted settings, and in some cases can also be presented with an image 424 that was captured using the settings before adjustment by the user. Such an approach can allow a user to adjust settings until the user likes the results, even if the user has no idea what the settings mean or which values might be appropriate. The user can instead adjust until the user like the resulting image, and then can cause those settings to be applied to the camera and/or saved as a scene setting, among other such options. In at least some embodiments there can be a relatively live update with each change in settings, limited only by factors such as the maximum rate of image capture and time needed to adjust the settings.

Figure 5:
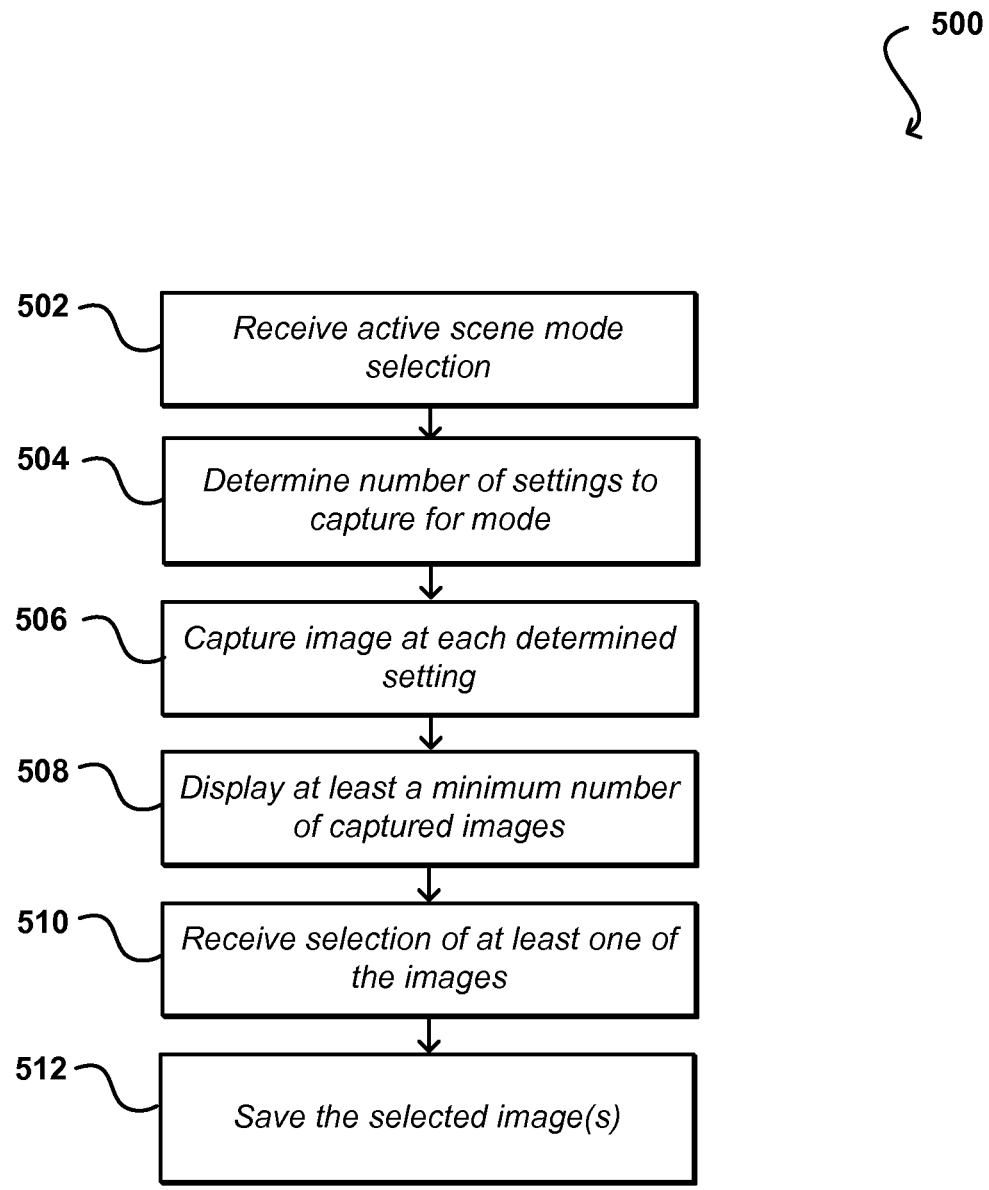
FIG. 5 illustrates an example process for enabling a user to select from a set of images captured with different camera settings in accordance with various embodiments.

FIG. 5 illustrates an example process 500 for enabling a user to obtain an image with an image quality that is satisfactory to the user, which can be utilized in accordance with various embodiments. It should be understood that there can be additional, fewer, or alternative steps performed in similar or alternative orders, or in parallel, within the scope of the various embodiments unless otherwise stated. In this example, a selection of an imaging mode such as an active scene mode is received 502. As discussed, various other modes or options can be utilized as well, and the selection can be made through hardware and/or software in various embodiments. Once in active scene mode, a number of scene settings to use for image capture can be determined 504.

As mentioned, the selection of scene settings can be a default selection or a selection based at least in part upon information provided by a user, a device sensor, or another such source. In response to receiving an instruction to capture an image, an image can be captured 506 at each of the determined scene settings. In some embodiments a single camera will capture each image in series, although for devices with multi-part sensors and/or multiple cameras at least some of these images can be captured concurrently. In some embodiments with multiple cameras, one camera can be changing camera settings while another camera is capturing an image, in order to reduce overall capture time.

After at least one, if not all, of the images have been captured, at least a subset (e.g., a minimum number) of the images can be displayed 508 on an appropriate display device. In some embodiments, the images will be shown and/or selected for display in the order they were captured, while in other embodiments the images can be sorted based on image quality parameters or other such factors. In at least some embodiments, the device might also display a recommended scene setting, based upon factors such as overall brightness, contrast, etc. Other settings can be highlighted as well, such as scene settings previously selected by a user, p[previously selected in similar imaging conditions, previously selected at this location, etc. In response to receiving 510 a selection of at least one of the displayed images, the corresponding full image(s) can be saved, whether on the device, in a remote data store, or elsewhere. In embodiments where a user selects two or more of the images, the device can attempt to merge those images to create an improved image, such as by averaging the pixel values for corresponding pixel locations in each of the images.

Figure 6:
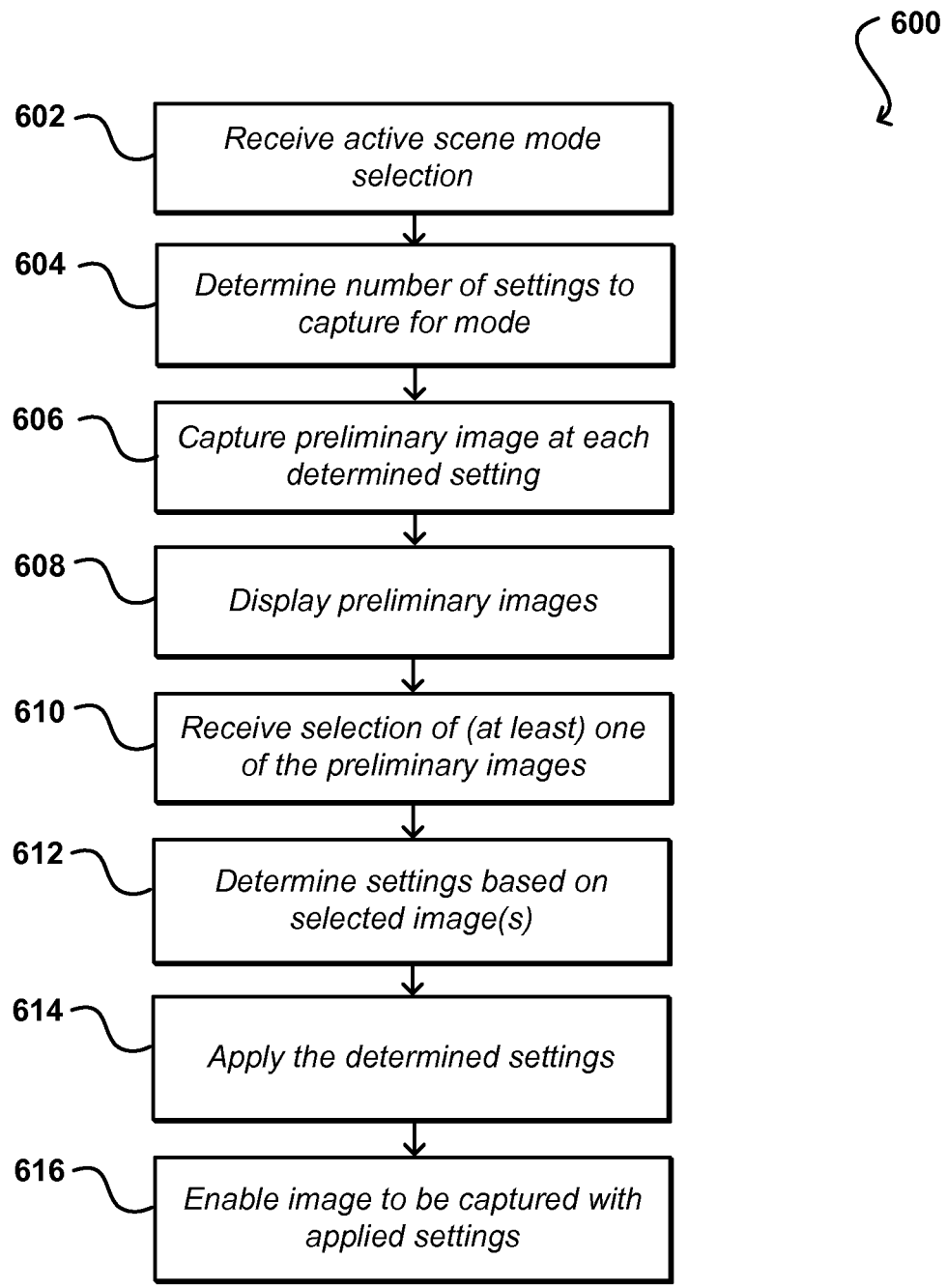
FIG. 6 illustrates an example process for enabling a user to select a set of settings to use to capture an image in accordance with various embodiments.

FIG. 6 illustrates another example process 600 that can be utilized in accordance with various embodiments. In this example, an instruction is received 602 to enter an active scene mode or similar such option. The number of scene settings to use to capture images is determined 604, and a preliminary image is captured 606 for each of the determined scene settings. At least a subset of the preliminary images is displayed 608 on a display device, enabling a user to determine which of the preliminary images have satisfactory image quality. As with the previous process, the device can indicate a recommended scene setting to use, based upon factors such as algorithm recommendations, previous selection, etc. Upon receiving 610 a selection of at least one of the preliminary images, the scene settings that were used to capture the image(s) can be applied 612 to the camera. If more than one image was selected, the device (or software in communication with the device) can attempt to determine camera settings that are a blend of the respective scene settings, such as by performing an average, weighted average, or other such combination approach for the values of each of the camera settings used. Once these settings are applied, the camera can enable 614 the user to capture one or more images with those settings.

Figure 7:
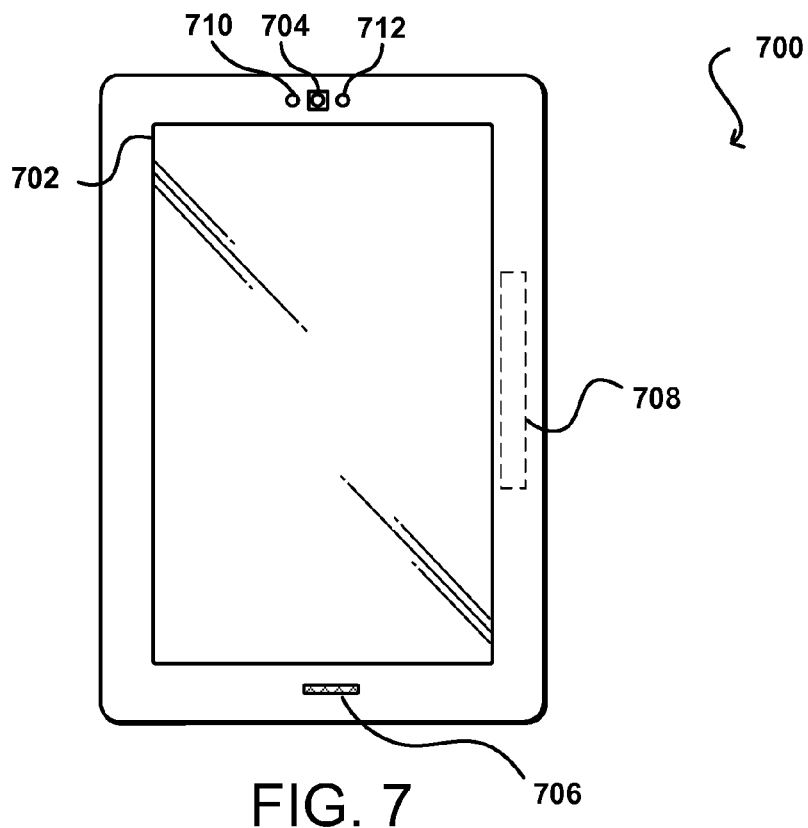
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish-eye lens, that enables the camera to capture images over a wide range of angles, such as 180 degrees or more. Further, each image capture element can comprise a digital still camera, configured to capture subsequent frames in rapid succession, or a video camera able to capture streaming video. The device may include other elements useful for imaging as well, as may include at least one light sensor 710 for determining an amount of ambient light around the device and a flash or illumination element 712, such as a white light or infrared LED, etc.

The example computing device 700 also includes at least one microphone 706 or other audio capture device capable of capturing audio data, such as words or commands spoken by a user of the device, music playing near the device, etc. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 8:
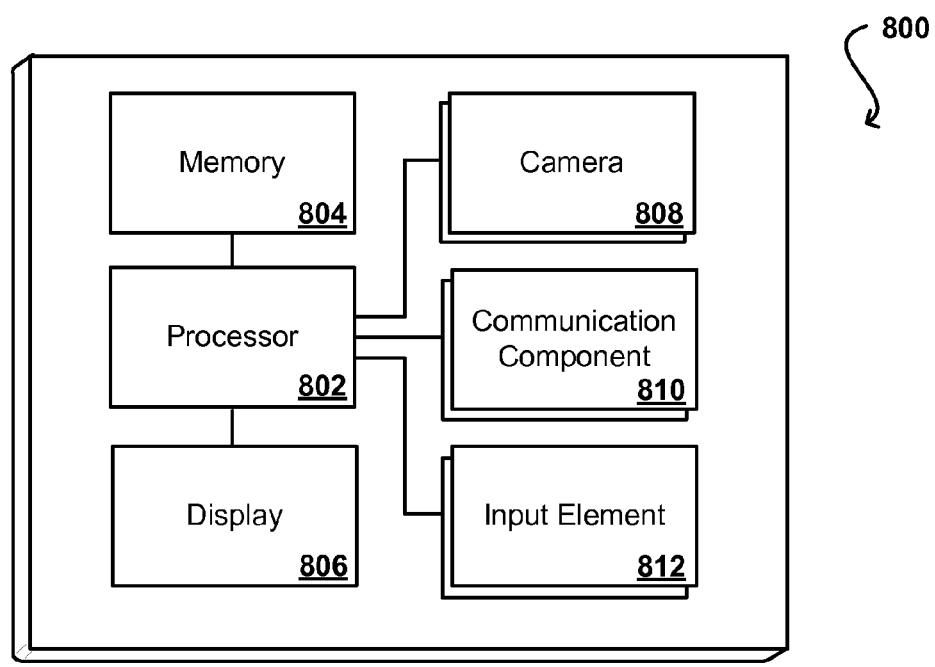
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one media capture element 808 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 800 of FIG. 8 can include one or more communication components 810, such as a Wi-Fi, Bluetooth, RF, wired, or wireless communication system. The device in many embodiments can communicate with a network, such as the Internet, and may be able to communicate with other such devices. In some embodiments the device can include at least one additional input element 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 9:
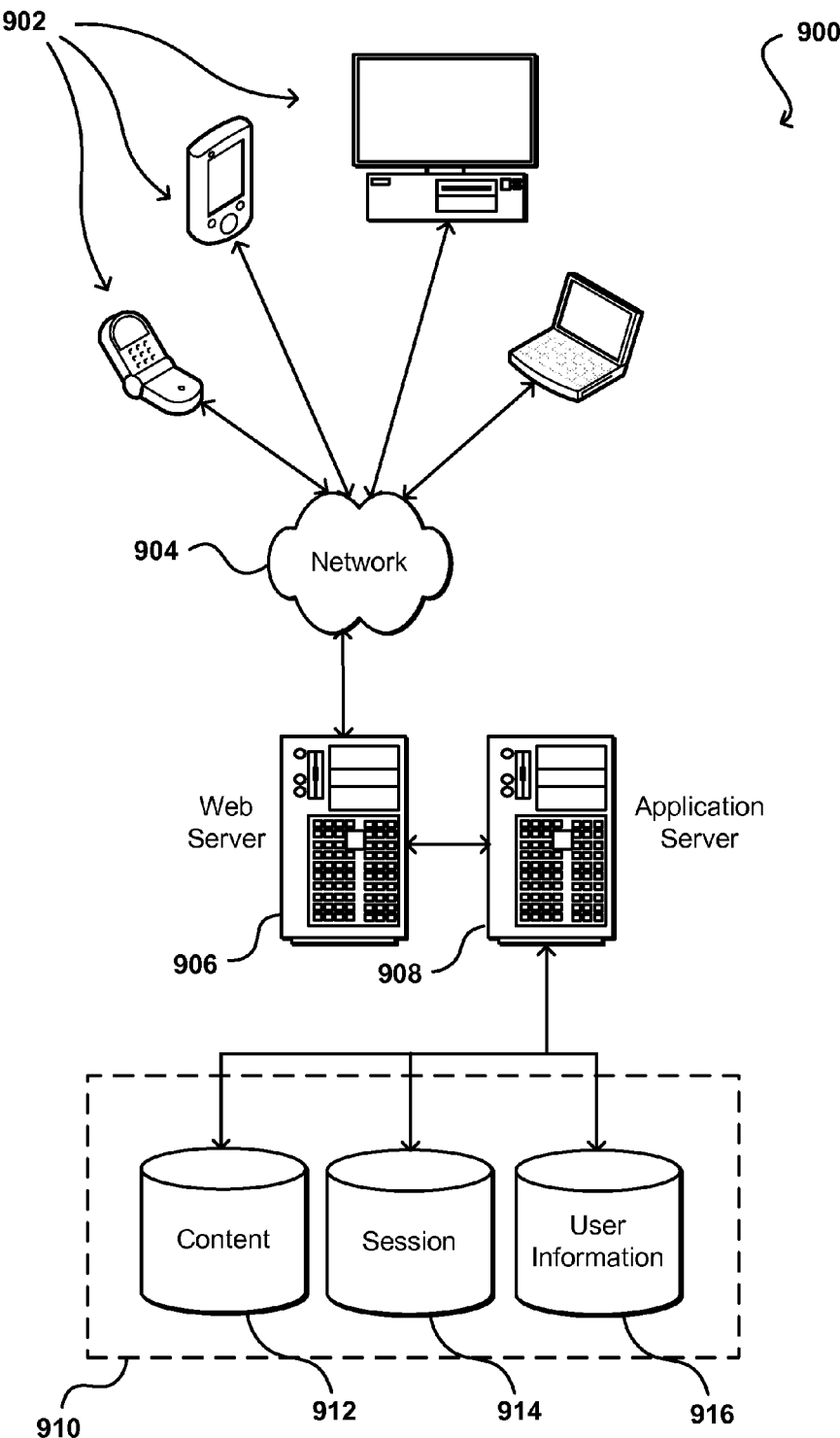
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate non-transitory media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a display screen;
   a first camera;
   a second camera; and
   a memory device including instructions that, when executed by the at least one processor, cause the computing device to:
      receive an instruction to initiate an image capture process using the first camera and the second camera;
      capture a first plurality of images using the first camera;
      capture a second plurality of images using the second camera;
      display, on the display screen, the first plurality of images;
      receive a first selection of a first image of the first plurality of images, the first image being associated with a first camera setting value for a camera setting;
      display, on the display screen, the second plurality of images;
      receive a second selection of a second image of the second plurality of images, the second image being associated with a second camera setting value different from the first camera setting value;
      determine a third camera setting value between the first camera setting value and the second camera setting value; and
      store the third camera setting value for at least one of the first camera or the second camera.

2. The computing device of claim 1, wherein the first camera has a multipart camera sensor, and wherein at least two images of the first plurality of images are acquired at a same time using different portions of the multipart camera sensor.

3. The computing device of claim 1, wherein the camera setting includes at least one of an ISO setting, a white balance setting, a color balance setting, a shutter speed, a flash setting, an exposure setting, a gain setting, or an aperture setting.

4. A computer-implemented method comprising:
   receiving an instruction to initiate an image capture process using a first camera and a second camera;
   capturing a first plurality of images using the first camera;
   capturing a second plurality of images using the second camera;
   displaying the first plurality of images;
   displaying the second plurality of images;
   receiving a first selection of a first image of the first plurality of images, the first image being associated with a first camera setting value for a camera setting;
   receiving a second selection of a second image of the second plurality of images, the second image being associated with a second camera setting value different from the first camera setting value;
   determining a third camera setting value between the first camera setting value and the second camera setting value; and
   storing the third camera setting value for at least one of the first camera or the second camera.

5. The computer-implemented method of claim 4, further comprising:
   determining a set of scene settings, each scene setting of the set of scene settings including a respective camera setting value for each camera setting; and
   applying the respective camera setting value for each camera setting.

6. The computer-implemented method of claim 5, wherein the set of scene settings is determined based at least in part upon at least one of user specification, user preferences, user behavior, or at least one current imaging condition.

7. The computer-implemented method of claim 4, further comprising:
   acquiring at least one additional image using the third camera setting value.

8. The computer-implemented method of claim 4, further comprising:
   receiving, from a user, the first camera setting value to be used in acquiring at least one image of the first plurality of images.

9. The computer-implemented method of claim 4, wherein the camera setting includes at least one of an ISO setting, a white balance setting, a color balance setting, a shutter speed setting, a flash setting, or an aperture setting.

10. The computer-implemented method of claim 4, further comprising:
    suggesting at least one of the first image or the second image for selection by a user.

11. The computer-implemented method of claim 4, further comprising:
    receiving an instruction to operate in a specified imaging mode; and
    determining the first camera setting value for the camera setting based at least in part upon the specified imaging mode.

12. The computer-implemented method of claim 4, further comprising:
    receiving an indication of a single selection of a shutter-release element; and
    causing the first plurality of images to be acquired in response to the indication.

13. A computer-implemented method, comprising:
receiving an instruction to a computing device to initiate an image capture process;
capturing, using a first camera of the computing device, a first plurality of images;
displaying the first plurality of images;
receiving a first selection of a first image of the first plurality of images, the first image being associated with a first camera setting value for a camera setting;
receiving a second selection of a second image of the first plurality of images, the second image being associated with a second camera setting value different from the first camera setting value;
determining a third camera setting value between the first camera setting value and the second camera setting value; and
storing the third camera setting value for the first camera.

14. The computer-implemented method of claim 13, further comprising:
receiving an instruction to remove a specified image from the first plurality of images, the specified image being associated with a fourth camera setting value;
capturing, using the first camera, an additional image using at least one new camera setting value that is different from the fourth camera setting value; and
displaying the additional image.

15. The computer-implemented method of claim 13, further comprising:
capturing, using the first camera, at least one additional image using the third camera setting value; and
displaying the at least one additional image.

16. The computer-implemented method of claim 13, further comprising:
determining at least one imaging condition; and
selecting the first camera setting value based at least in part upon the at least one imaging condition.

17. The computer-implemented method of claim 16, wherein the at least one imaging condition is determined at least in part using at least one of a light sensor, a global positioning system (GPS) device, an electronic compass, an electronic barometer, a digital clock, or a user input.

18. The computing device of claim 1, wherein the instructions further cause the computing device to:
determine a first weight to apply to the first camera setting value; and
determine a second weight to apply to the second camera setting value,
wherein the third camera setting value is based at least in part upon the first weight and the second weight.

19. The computer-implemented method of claim 4, further comprising:
determining a first weight to apply to the first camera setting value; and
determining a second weight to apply to the second camera setting value,
wherein the third camera setting value is based at least in part upon the first weight and the second weight.

20. The computer-implemented method of claim 13, further comprising:
capturing a second plurality of images using the first camera;
capturing a third plurality of images using a second camera of the computing device;
receiving a third selection of a third image of the second plurality of images, the third image being associated with a fourth camera setting value;
receiving a fourth selection of a fourth image of the third plurality of images, the fourth image being associated with a fifth camera setting value different from the fourth camera setting value;
determining a sixth camera setting value between the fourth camera setting value and the fifth camera setting value; and
storing the sixth camera setting value for at least one of the first camera or the second camera.

* * * * *